(12) United States Patent
Boy et al.

(10) Patent No.: US 9,248,760 B2
(45) Date of Patent: Feb. 2, 2016

(54) LOCKING AND INCLINATION-ADJUSTING ARRANGEMENT, IN PARTICULAR BACKREST LOCK

(71) Applicants: VOLKSWAGEN AKTIENGESELLSCHAFT, Wolfsburg (DE); WITTE AUTOMOTIVE GMBH, Velbert (DE)

(72) Inventors: Hans-Joachim Boy, Gifhorn (DE); Robert Wagels, Geilenkirchen (DE); Reinaldo Mensch, Wuppertal (DE)

(73) Assignees: VOLKSWAGEN AKTIENGESELLSCHAFT, Wolfsburg (DE); WITTE AUTOMOTIVE GMBH, Velbert (DE)

(*) Notice: Subject to any disclaimer, the term of this patent is extended or adjusted under 35 U.S.C. 154(b) by 0 days.

(21) Appl. No.: 14/353,338

(22) PCT Filed: Oct. 8, 2012

(86) PCT No.: PCT/EP2012/004202
§ 371 (c)(1),
(2) Date: Apr. 22, 2014

(87) PCT Pub. No.: WO2013/056792
PCT Pub. Date: Apr. 25, 2013

(65) Prior Publication Data
US 2014/0284974 A1    Sep. 25, 2014

(30) Foreign Application Priority Data
Oct. 22, 2011    (DE) .......................... 10 2011 116 709

(51) Int. Cl.
*B60N 2/22*    (2006.01)
*B60N 2/015*    (2006.01)
*B60N 2/36*    (2006.01)

(52) U.S. Cl.
CPC .......... *B60N 2/2245* (2013.01); *B60N 2/01583* (2013.01); *B60N 2/366* (2013.01)

(58) Field of Classification Search
CPC .. B60N 2/2245; B60N 2/366; B60N 2/01583; B60N 2205/20; B60N 2205/35; Y10S 292/22
USPC ...................................................... 297/378.13
See application file for complete search history.

(56) References Cited

U.S. PATENT DOCUMENTS 4,637,648 A * 1/1987 Okino et al. ..................... 296/63
4,773,693 A * 9/1988 Premji et al. ............... 296/65.03
(Continued)

FOREIGN PATENT DOCUMENTS

DE    30 45 309 A1    6/1982
DE    43 16 567 A1    11/1994
(Continued)

OTHER PUBLICATIONS

International Search Report Issued for PCT International Application No. PCT/EP2012/004202, mailed Dec. 14, 2012.
(Continued)

*Primary Examiner* — Joshua J Michener
*Assistant Examiner* — Matthew Gitlin
(74) *Attorney, Agent, or Firm* — Pearl Cohen Zedek Latzer Baratz LLP

(57) ABSTRACT

The invention relates to a locking and inclination-adjustment assembly for locking and adjusting the inclination of a part, especially a pivotable backrest (R, R1, R2) of a vehicle, comprising a lock striker (30) arranged on the car body and a lock (S) arranged on the part, said lock (S) being joined to the lock striker (30) when in a locked position (I, II) and being detachable from the lock striker (30) when in an unlocked position (III). It is provided that the lock (S) arranged on the part has rotary catches (10, 20) with corresponding locking pawls (15, 25), whereby the part can be moved and locked in several reversible latching positions (I, II) on the lock striker (30) that engages with the lock (S), and the part can be moved into the unlocked position (III) separately from the lock striker (30).

9 Claims, 7 Drawing Sheets

(56) References Cited

U.S. PATENT DOCUMENTS

| | | | |
|---|---|---|---|
| 5,370,440 A | 12/1994 | Rogala | |
| 5,855,414 A * | 1/1999 | Daniel et al. | 297/378.13 |
| 6,412,849 B1 * | 7/2002 | Fast | 296/65.03 |
| 2006/0082204 A1 * | 4/2006 | Zhang | 297/366 |
| 2006/0170270 A1 * | 8/2006 | Inoue et al. | 297/378.12 |
| 2006/0208505 A1 * | 9/2006 | Christoffel et al. | 292/216 |
| 2007/0210588 A1 * | 9/2007 | Cetnar | 292/216 |
| 2008/0191535 A1 * | 8/2008 | Baumchen et al. | 297/367 |
| 2010/0052336 A1 * | 3/2010 | Bendel et al. | 292/196 |
| 2010/0213746 A1 | 8/2010 | Perkins et al. | |

FOREIGN PATENT DOCUMENTS

| | | |
|---|---|---|
| DE | 195 40 390 A1 | 5/1997 |
| DE | 197 06 786 C1 | 10/1998 |
| DE | 198 57 947 A1 | 6/2000 |
| DE | 199 26 839 C1 | 1/2001 |
| DE | 102 09 759 A1 | 9/2003 |
| DE | 103 54 161 A1 | 6/2005 |
| DE | 10 2004 048 821 A1 | 4/2006 |
| DE | 10 2008 064 523 A1 | 7/2009 |
| DE | 10 2008 020 139 A1 | 10/2009 |
| FR | 2 532 595 A1 | 3/1984 |
| FR | 2 892 984 A1 | 5/2007 |
| JP | 2008 087 679 A | 4/2008 |

OTHER PUBLICATIONS

German Search Report Issued for German Patent Application No. 10 2011 116 709.2, mailed May 30, 2012.

* cited by examiner

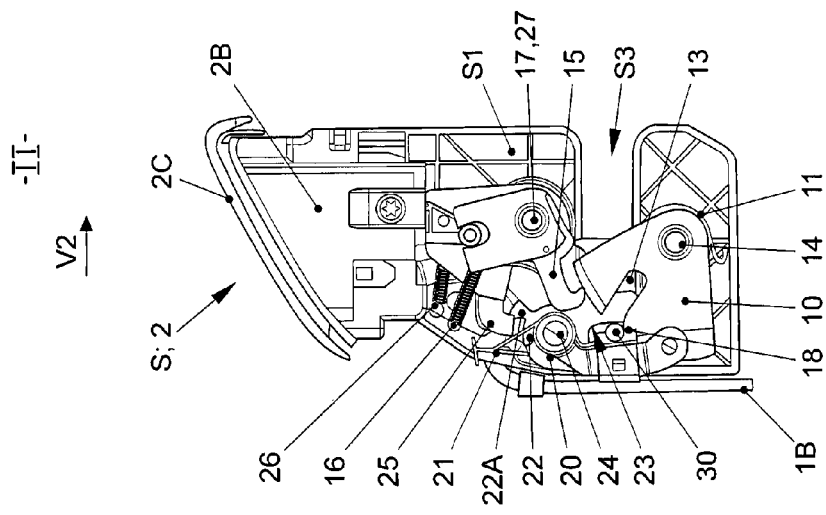
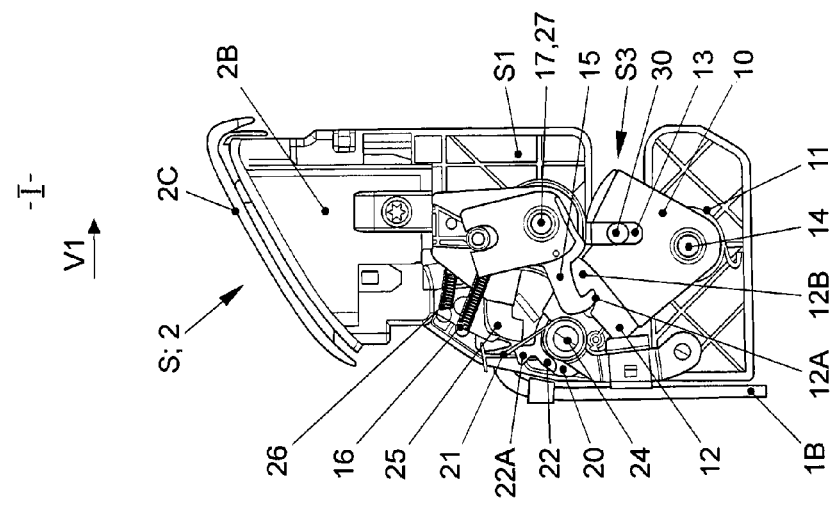
FIG. 2B
FIG. 2A

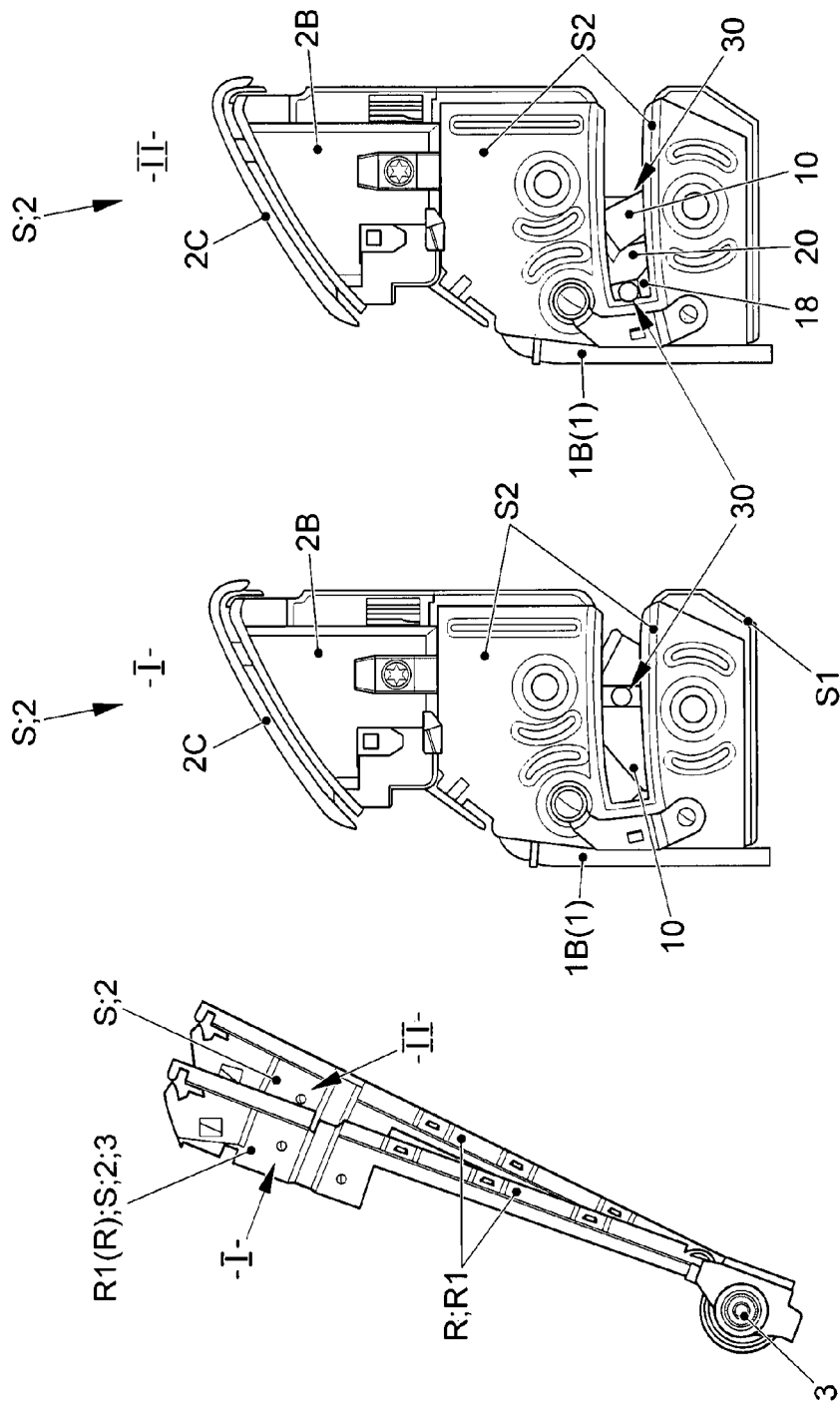

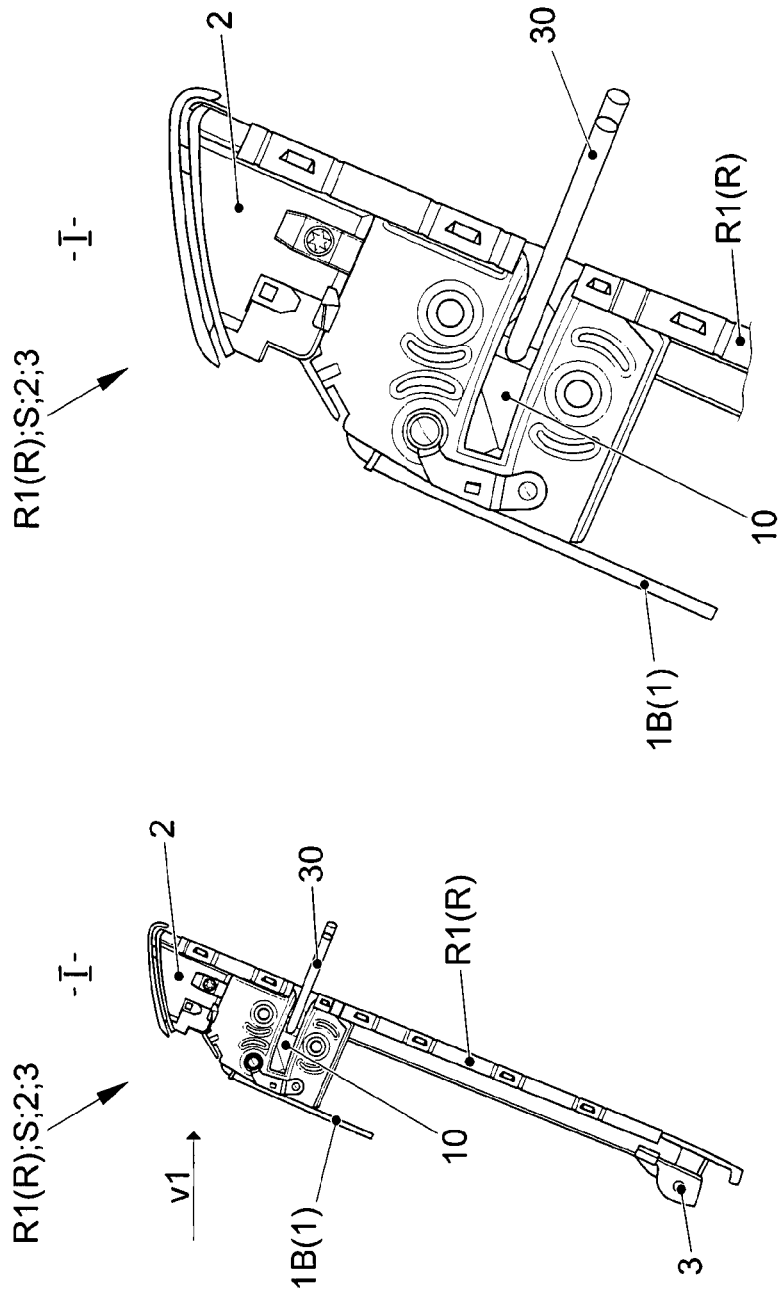

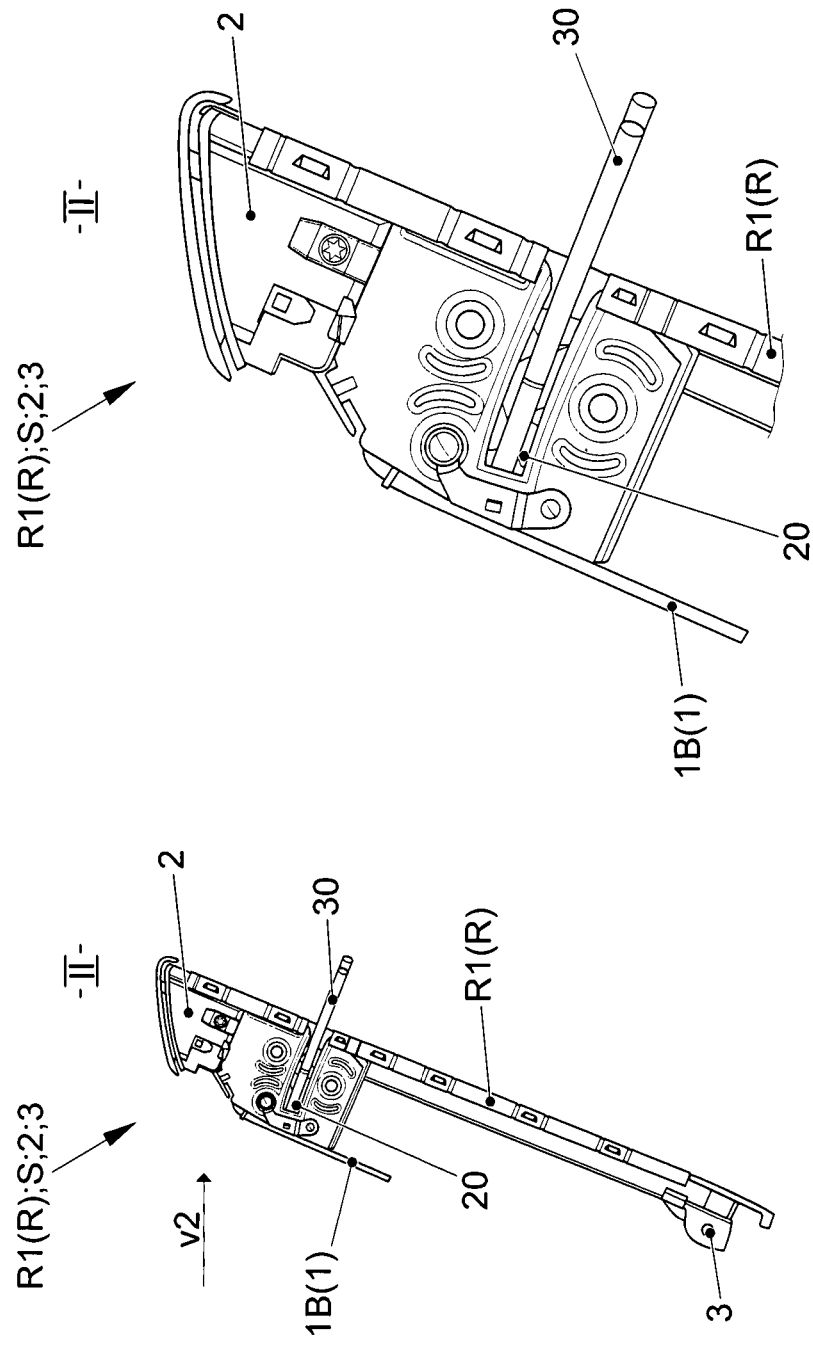

LOCKING AND INCLINATION-ADJUSTING ARRANGEMENT, IN PARTICULAR BACKREST LOCK

CROSS-REFERENCE TO RELATED APPLICATIONS

This application is a National Phase Application of PCT International Application No. PCT/EP2012/004202, International Filing Date Oct. 8, 2012, claiming priority from German Patent Application No. 10 2011 116 709.2, filed Oct. 22, 2011, which are hereby incorporated by reference.

FIELD OF THE INVENTION

The present invention relates to a locking and inclination-adjustment assembly for a motor vehicle seat.

BACKGROUND OF THE INVENTION

It is a known procedure to secure fold-down backrests of motor vehicle seats to the car body in such a way that they can be unlocked. The state of the art discloses approaches in which the moveable backrest can be operated by a vehicle user and can be detached from the car body either manually or by means of actuators. The manual or automatic locking devices needed for this purpose are, for the most part, arranged at the side of the backrest. Such locking devices that are arranged at the side of the backrests of motor vehicle seats and that serve either only to fold down the backrest or else to fold down as well as to adjust the inclination of the backrest are the subject matter of several publications.

Manual locking and inclination-adjustment devices can be gleaned from various publications.

German patent application DE 195 40 390 A1 discloses a vehicle seat having a manually operated holding device for affixing a vehicle backrest to the car body. Holding elements are configured on the backrest and on the car body in order to allow a limited adjustment capability of the backrest inclination relative to the seat cushion while, at the same time, securing the backrest to the car body. The positioning of the backrest relative to the seat cushion can be freely selected within certain limits.

German patent application DE 30 45 309 A1 describes another manually operated assembly for the back seat of a motor vehicle, with a backrest that can be folded down towards the front and that is held near its upper end on the car body by means of a pin and a latching means that interacts with the pin. The pin can be moved—with the backrest or with a guide element that is attached to the car body—parallel to itself approximately in the lengthwise extension of the vehicle, and it can be joined to the latching means present on the car body or on the backrest in several positions that result in several different angular positions for the backrest.

Automatically driven locking and/or inclination-adjustment devices can likewise be gleaned from several publications.

German patent application DE 43 16 567 A1 describes an automatically driven inclination-adjustment device for a backrest. This document discloses a vehicle seat comprising a seat part to whose lower end a pivotable backrest is hinged. A pivoting range is attained for the backrest in that an actuator operated by an electric motor and arranged on a pillar engages with the backrest at a distance from the pivoting axis of the backrest and executes the pivoting movement of the backrest.

Another automatically operated inclination-adjustment device for a backrest is disclosed in German patent application DE 102 09 759 A1. A vehicle seat or a back seat comprises a seat part and a backrest, both of which have a fold-down function effectuated by an electric drive, whereby the fold-down function causes the backrest or a part of the backrest to fold down relative to the seat part. The fold-down function is realized in that the electric drive has an inclination-adjustment function, whereby the adjustment speed of the electric drive can be varied in such a way that a different speed can be set for the inclination-adjustment function and for the fold-down function.

Moreover, a combined capability for locking and unlocking as well as for electrically adjusting the inclination of a backrest is disclosed in German patent specification DE 199 26 839 C1. This patent document describes an inclination-adjustment device having a bracket-like receptacle that is connected to a backrest, especially at its upper end, so that it can pivot by means of a laterally arranged locking pawl. Here, releasing this locking pawl allows not only for the inclination to be adjusted but also for the backrest to be folded down.

German patent application DE 10 2008 064 523 A1 discloses another locking-adjustment arrangement for locking and adjusting a fold-down backrest of a seat of a motor vehicle by means of a drive means. The locking-adjustment arrangement for locking and adjusting a pivotable backrest has a locking-adjustment device that is attached to the car body and that comprises a locking element as well as a lock situated on the backrest. Here, the locking-adjustment device has a support part that interacts with a drive spindle and that supports the locking element, and it also has a drive means, so that the inclination of the backrest that is connected to the locking element can be adjusted by means of the locking element that is operatively connected to the drive means.

It has been found in actual practice that the approaches involving a drive are very convenient in terms of adjusting the inclination. However, they are relatively complex and consequently expensive, in addition to which two drives are, in fact, needed—especially in the case of multi-part backrests having multiple sections—so that the inclination of the parts of a two-part backrest can be adjusted automatically and separately. For this reason, there continues to be a great need for manual locking and adjustment assemblies that are not only inexpensive but also as convenient as possible. In this context, the invention is based on certain preconditions which a new manual locking and adjustment assembly is supposed to meet. A first precondition is that only a small amount of effort should be involved in the production of a locking and adjustment assembly as far as the car body is concerned. A second precondition is that the backrest inclination should be adjustable and also that it should be possible to unlock the backrest to fold it down onto the seat part. A third precondition pertains to the safety of the locking and adjustment assembly. The backrest should always remain in a secured state during the inclination adjustment, so that the inclination can be adjusted without this allowing the backrest to be freely movable relative to the car body. At least one of these preconditions is not met by the locking and adjustment arrangements known from the state of the art.

SUMMARY OF THE INVENTION

Thus, the invention is based on the objective of creating a safe locking and adjustment assembly, especially a safe backrest lock that is installed on a backrest and that allows a safe locking and inclination adjustment relative to the car body, whereby the work needed in order to attach the backrest to the car body should be kept to minimum as far as the car body is concerned.

The starting point of the invention is a locking and inclination-adjustment assembly for locking and adjusting the inclination of a part, especially a pivotable backrest of a vehicle, comprising a lock striker arranged on the car body and a lock arranged on the part, said lock being joined to the lock striker when in a locked position and being detachable from the lock striker when in an unlocked position.

In conjunction with these features of the refined locking and inclination-adjustment assembly, the lock arranged on the part has rotary catches with corresponding locking pawls, whereby the part can be moved and locked in several reversible latching positions on the lock striker that engages with the lock, and the part can be moved into the unlocked position separately from the lock striker. Advantageously, for purposes of the locking and the inclination adjustment, several rotary catches and their corresponding locking pawls are arranged inside the lock that is arranged on the part. Rotary catches with corresponding locking pawls constitute secure locking elements which are particularly sturdy and durable, in addition to which they undergo hardly any wear and tear.

In a preferred embodiment of the invention, it is provided that the actuation of a first actuation mechanism associated with the locking and inclination-adjustment assembly brings about an adjustment of the various inclinations of the part, from one latching position to the other and vice versa. Advantageously, changing from one latching position to the other and vice versa is possible. The various latching positions make it possible to set a cargo position or a normal position for the backrest, whereby the description will elaborate upon the advantages that can be achieved.

In another preferred embodiment of the invention, the adjustment of the various inclinations of the part from one latching position to the other and vice versa takes place by actuating a first actuation mechanism, without this causing the part to move into the unlocked position. This advantageously translates into a safety function since the inclination of the part can be adjusted from one latching position to the other and vice versa, without this causing the part to move into the unlocked position. Consequently, the part can be adjusted from one latching position to the other and vice versa, without this causing the part to move into an unlocked position that would diminish the safety of the part.

In a preferred manner, it is provided that the backrest is only completely unlocked by means of the lock striker when a second actuation mechanism associated with the assembly is actuated. Here, it is provided that the part can be unlocked from every latching position of the part and moved into the unlocked position.

Consequently, the complete unlocking advantageously can only be executed by the second actuation mechanism. This second actuation mechanism, which causes the part to be completely unlocked, is thus separated from the first actuation mechanism, so that improper operation is ruled out. As will still be elaborated upon in the description, the actuation mechanisms are also physically separated from each other, which helps to prevent improper operation. When the locking and inclination-adjustment assembly is used in a vehicle, in order to further enhance the safety, it is provided that the second actuation mechanism allows the part to be unlocked from each of the latching positions into the unlocked position if the vehicle is not moving, whereby a control signal can be impinged onto the second actuation mechanism, thus only allowing a complete unlocking of the part if the vehicle is not moving.

It is likewise provided that, when the part is in its unlocked position, it can be locked in one of the two rotary catches in one latching position or the other as a result of a speed-dependent folding movement of the part. As a result, the user can easily reach one latching position or the other simply by means of the speed of the folding movement of the part. In an advantageous manner, no complicated components need to be provided for this purpose. The parts arranged in the backrest lock, which are already arranged in the backrest lock anyway in order to lock the part, are arranged in such a way that the speed-dependent folding movement of the part allows either one latching position or the other to be reached. In this context, it is provided that, when the part is in the unlocked position, it can be locked in the first latching position in a first rotary catch as a result of a folding movement at a first speed, or else it can be locked in the second latching position in a second rotary catch as a result of a folding movement at a second speed, whereby the first speed is slower than the second speed.

Moreover, it is advantageously provided that, by means of a backrest-folding mechanism associated with the assembly, the part can be automatically moved with the assistance of springs out of the latching positions into the unlocked position, or out of the second latching position into the first latching position. This arrangement of the backrest-folding mechanism makes it very convenient to operate the part fitted with the locking and inclination-adjustment assembly since some of the adjustment movements are assisted by the backrest-folding mechanism.

Additional preferred embodiments of the invention can be gleaned from the other features put forward in the subordinate claims.

BRIEF DESCRIPTION OF THE DRAWINGS

The invention will be explained in greater detail below on the basis of the accompanying drawings. The following is shown:

FIG. 2A a side view of a backrest lock without a housing cover, with a lock striker in a first latching position of the locked position;

FIG. 2B the backrest lock according to FIG. 2A, with the lock striker in a second latching position of the locked position;

FIG. 3A a side view of the backrest lock in the housing, with a lock striker in a first latching position of the locked position;

FIG. 3B a side view of the backrest lock in the housing, with a lock striker in a second latching position of the locked position;

FIG. 3C a side view of a backrest or of a part of the backrest, in the first and second latching positions, according to FIGS. 3A, 3B;

FIG. 4A a side view of the backrest lock in the first latching position, according to FIG. 3A, although together with the backrest or a part of the backrest in its cargo position;

FIG. 4B a side view of the backrest lock in the second latching position, according to FIG. 3B, although together with the backrest or a part of the backrest in its normal position;

FIG. 4C-1 the backrest or a part of the backrest, according to FIG. 4A, with its backrest-folding mechanism and the backrest lock in the cargo position;

FIG. 4C-2 the backrest or a part of the backrest, according to FIG. 4B, with its backrest-folding mechanism and the backrest lock in the normal position.

BRIEF DESCRIPTION OF THE INVENTION

Figure 1A:
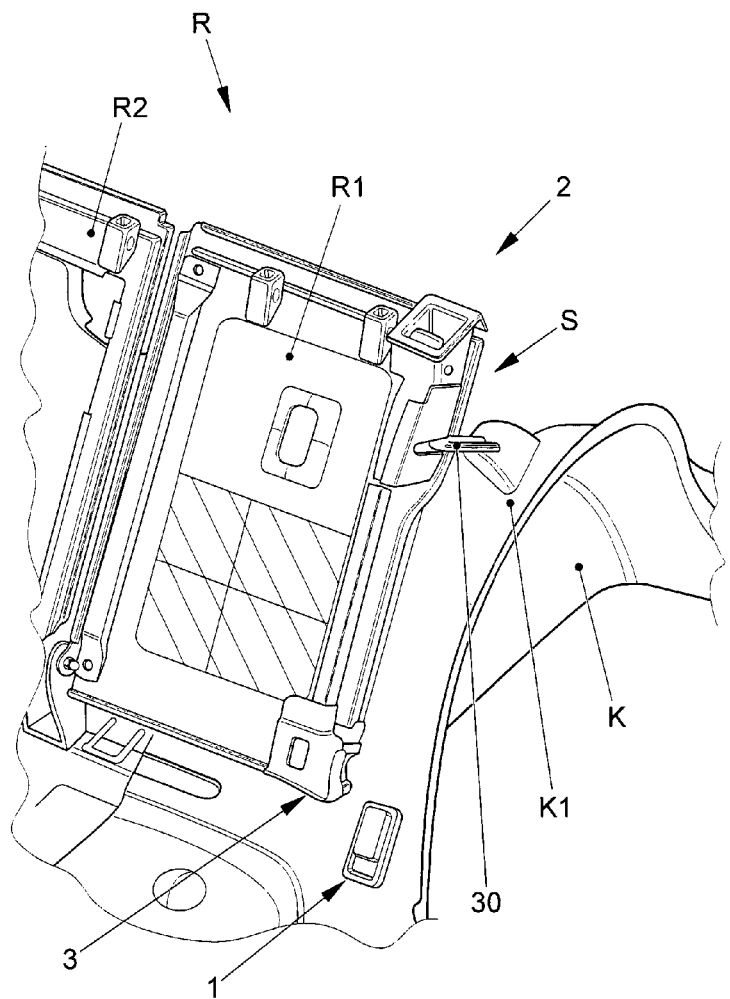
FIG. 1A a perspective view of a locking and inclination-adjustment assembly, especially a backrest lock that holds a backrest or a part of the backrest in a locked position relative to the car body by means of a lock striker.

FIG. 1A shows a perspective view of a locking and inclination-adjustment assembly referring to the example of a backrest lock S that holds a backrest R, R1, R2 in a locked position I/II relative to the car body K by means of a lock striker 30.

In the embodiment shown, the backrest lock S is arranged at the side and close to an upper edge of a first part R1 of a backrest R belonging to a back seat. The backrest R or a part of the backrest R1, R2 can be locked relative to the car body K and its inclination I can be adjusted by means of the backrest lock S. For purposes of illustrating the possible partial locking and inclination adjustment of the backrest R, the latter is configured with multiple sections, so that, for example, an unlocked first part R1 of the backrest R can be folded down—in contrast to a second part R2 of the backrest R—onto a seat part (not shown here). Analogously, the second part R2 of the backrest R can be folded down onto a seat part, independently of the first part R1 of the backrest R. It goes without saying that a backrest R that is not divided into sections or a multi-part backrest R—provided that the parts R1, R2 of the backrest R are joined to each other in a way that they can be separated at times—can be unlocked in its entirety and folded down onto the seat part, or else the inclination of the entire backrest is adjustable. If it is supposed to be possible to unlock the parts R1, R2 of the backrest R and to adjust their inclination separately from each other, then a backrest lock S is arranged on each part R1, R2. The description below is made on the basis of a first part R1 of the backrest R. The description applies analogously to a second part R2 of the backrest R or for an entire backrest R.

The lock striker 30 is arranged in the upper area of a wheel well K1 belonging to the car body K and it is securely joined to the wheel well K1. Preferably, the lock striker 30 is welded to the wheel well K1. The longitudinal axis of the lock striker 30 is oriented in the driving direction and it is located at approximately the height of the backrest lock S by virtue of where it is arranged on the wheel well K1. Therefore, the lock striker 30 is likewise close to the upper edge of the first part R1 of the backrest R that belongs, for example, to a back seat, whereby the lock striker 30 is situated behind the first part R1 of the backrest R, so that the lock striker 30 can engage from the rear into the backrest lock S.

The locking and inclination adjustment of the first part of the backrest R1 relative to the car body K, K1 via the backrest lock S is possible just by means of the lock striker 30 as far as the car body is concerned. Other parts are not needed on the car body. As a result, the envisaged first precondition is met, namely that only a small amount of production effort is needed involving the car body.

Figure 1B:
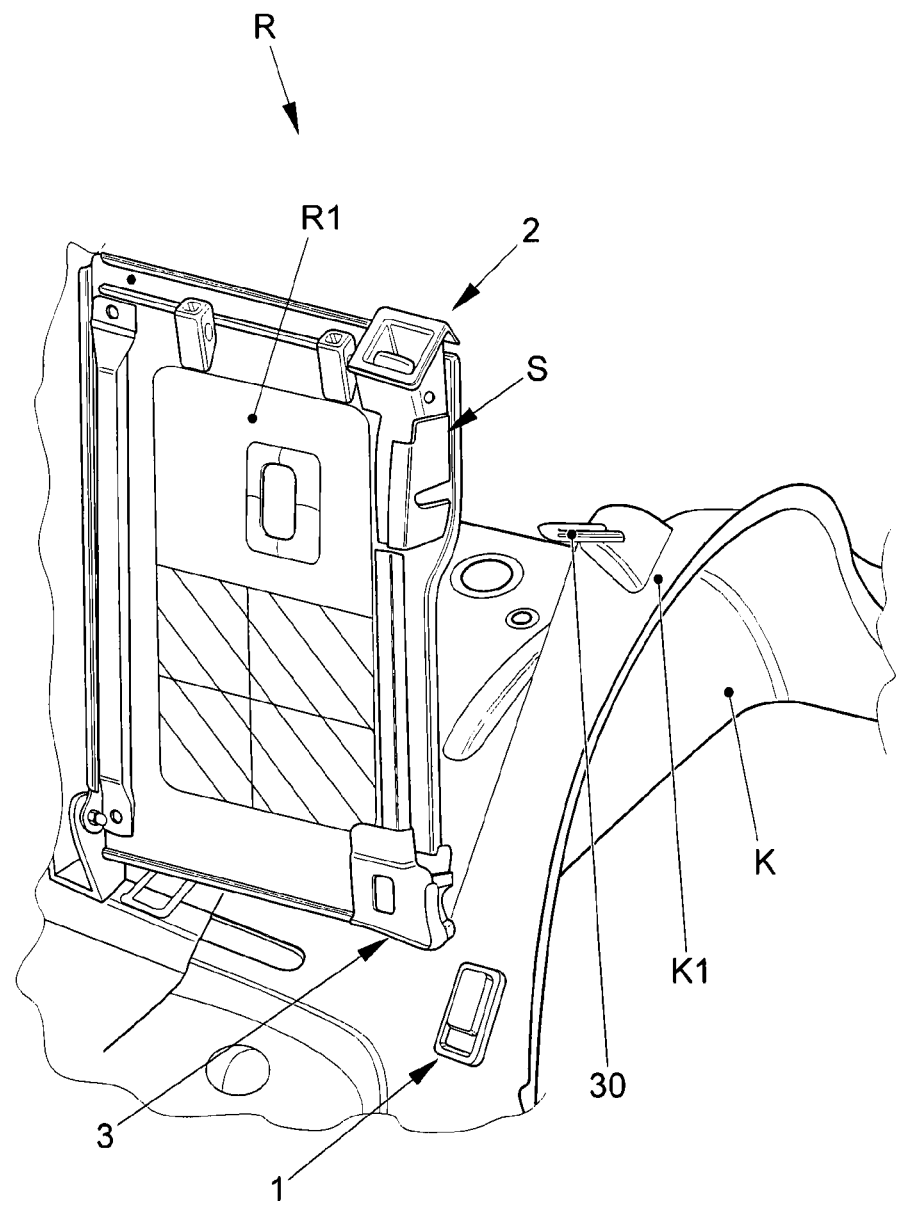
FIG. 1B the locking and inclination-adjustment assembly according to FIG. 1A in an unlocked position.
Figure 1C:
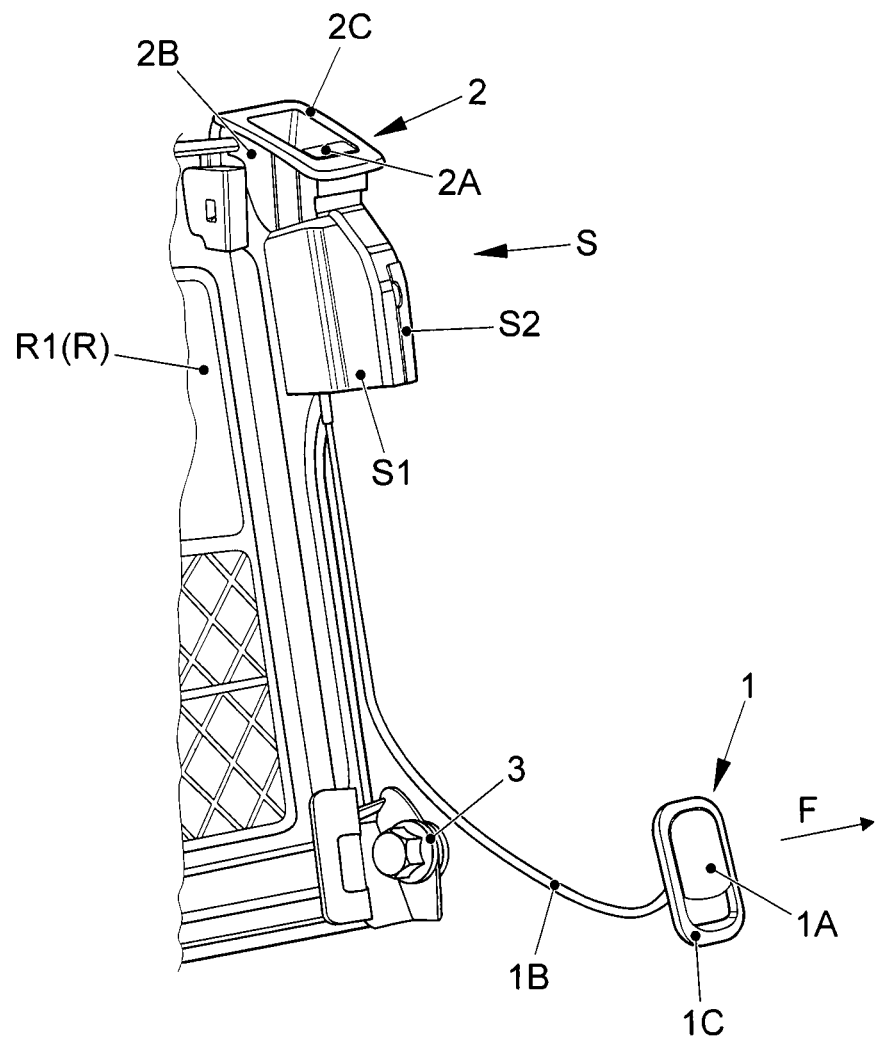
FIG. 1C an enlarged perspective view of a first and second actuation mechanism belonging to the locking and inclination-adjustment assembly as well as a backrest-folding mechanism.

The locking and inclination-adjustment assembly also comprises a first actuation mechanism 1, a second actuation mechanism 2 as well as a backrest-folding mechanism 3 whose arrangement will be elaborated upon in the description of FIG. 1C.

The backrest R or the first and second parts R1, R2 of the backrest R is/are arranged in the vehicle in or opposite to the driving direction of the vehicle so that it can pivot around a pivoting axis Y.

The backrest-folding mechanism 3 which, in the embodiment shown, is arranged in the area of the pivoting axis Y of the first part R1 of the backrest R, comprises a spring element that ensures that a force is exerted on the first part R1 of the backrest R, or else on the entire backrest if the first part R1 is joined to the second part R2 of the backrest R, and the direction of this force is configured such that, for instance, the unlocked first part R1 of the backrest R, or else the entire backrest R, is automatically pivoted forwards and folds down onto the seat part (not shown here).

In order for the first part R1 of the backrest R, or for the entire backrest R, to be able to fold down onto the seat cushion, the backrest lock S has to be unlocked relative to the lock striker 30, so that the first part R1 of the backrest R can move into an unlocked position III.

This unlocked position III of the first part R1 of the backrest R is shown in FIG. 1B. The lock striker 30 is separated from the backrest lock S, which is why the backrest-folding mechanism 3 starts to automatically fold down the first part R1 of the backrest R out of a position that is slightly inclined to the rear relative to an imaginary vertical line and onto the seat part while overcoming the vertical dead center position. The complete unlocking of the backrest lock S is carried out by means of the second actuation mechanism 2, and this will be elaborated upon below.

FIG. 1C shows an enlarged perspective view of the first and second actuation mechanisms 1, 2 as well as of the backrest-folding mechanism 3.

The first actuation mechanism 1 can be arranged in the area of the backrest lock S as well as on the car body K, K1 and on the structure of the backrest R, R1. In order to ensure a very convenient user-friendliness, the first actuation mechanism 1 in the embodiment shown is arranged on the car body close to the lower area of the backrest R and close to the front of the seat part (not shown in greater detail here). This creates a distance between the backrest lock S and the first actuating mechanism 1, said distance being bridged by means of a transmission means, in the embodiment shown, by a Bowden cable 1B.

The first actuating mechanism 1 comprises an actuating element 1A that is positioned in a holding cradle 1C. The holding cradle 1C is attached to the car body. The first actuating mechanism 1 serves to actuate the backrest lock S in order to reach a first latching position I or a second latching position II of the lock striker 30 inside the backrest lock S. In both latching positions I, II, the first part R1 of the backrest R is always in a locked position, although it is in different positions in the vehicle, depending on whether it is in latching position I or II; this will likewise still be elaborated upon below.

In the enlarged view of FIG. 1C, it can also be seen that the backrest lock S has a lock base S1 and a lock housing cover S2.

In the embodiment shown, the second actuating mechanism 2 is positioned directly on the backrest lock S and is thus an integral part of the backrest lock S. The second actuating mechanism 2 can be arranged separately, independent of the backrest lock S.

The second actuating mechanism 2 has an actuating element 2A that is likewise positioned in a holding cradle 2C. This holding cradle 2C, in turn, is anchored in a housing 2B of the second actuating mechanism 2. The housing 2B of the second actuating mechanism 2 is coupled to the lock base S1, as a result of which the second actuating mechanism 2 is an integral part of the backrest lock S.

In the lower area of the first part R1 of the divided backrest R, the backrest-folding mechanism 3 is shown in an enlarged view. If the first and second parts R1, R2 of the backrest R are joined together, the backrest-folding mechanism 3 causes the entire backrest R, or else the parts R1, R2 of it, to fold down onto the seat part, provided that the backrest lock S is completely unlocked.

The description below elaborates on the structure and the function of the backrest lock S as well as on the structure and the functions of the actuating mechanisms 1, 2 and also on the backrest-folding mechanism 3.

To start with, FIGS. 2A, 2B each show a side view of the backrest lock S without the housing cover, and they also show the lock striker 30 in the first latching position I of the locked position (FIG. 2A) and in the second latching position II of the locked position (FIG. 2A) [sic].

The backrest lock S (see both FIGS. 2A and 2B) comprises the holding cradle 2C and the actuating element 2A that is inside the holding cradle 2C and consequently cannot be seen in FIGS. 2A, 2B. The lock base S1 has a lock receptacle S3 that guides the lock striker 30 into the backrest lock S or that accommodates the lock striker 30 in the locked positions I, II in the lock base S1.

The backrest lock S comprises the parts described below, whereby the components that are essential for the function will be elaborated upon. The backrest lock S has a first and second rotary catch 10, 20 connected to the lock base S1. A first locking pawl 15 is associated with the first rotary catch 10 and a second locking pawl 25 is associated with the second rotary catch 20. The locking pawls 15, 25 are rotatably joined to the lock base S1.

Both rotary catches 10, 20 have a jaw-like rotary-catch receptacle 13, 23. A locking contour 12, 22 is arranged on both rotary catches 10, 20.

The locking contour 12 of the first rotary catch 10 has a groove-like receptacle 12A as a first contoured area into which a tab of the first locking pawl 15 engages when in the first latching position I of the locked position (FIG. 2A). At the same time, a recess of the first locking pawl 15 engages into a second contoured area of a web-like receiving section 12B of the first rotary catch 10, whereby the shape of the second contoured area matches the contour of the recess.

The locking contour 22 of the second rotary catch 20 is configured as a web-like projection 22A, whereby, in the second latching position II of the locked position (FIG. 2B), a tab of the second locking pawl 25 engages behind this web-like projection 22A of the second rotary catch 20.

The locking contours 12, 22 are each joined to the associated rotary catches 10, 20, whereby the rotary catches 10, 20 are arranged so that they can pivot relative to the lock base S1 around a pivoting axis 14, 24 which, in the embodiment shown, runs perpendicular to the driving direction.

Each rotary catch 10, 20 is associated with a spring element 11, 21, which is supported on the lock base S1 at one end, and affixed to the rotary catches 10, 20 at the other end. The spring elements 11, 21 cause a pivoted rotary catch 10, 20 to return to its prescribed starting position if no external force is exerted upon the rotary catch 10, 20 in question.

If a given rotary catch 10, 20 is pivoted by the effect of such a force, the associated spring element 11, 21 is tensioned. After the external force is withdrawn, the associated spring element 11, 21 relaxes and the stored spring tension force is transferred to the associated rotary catch 10, 20, so that the rotary catch 10, 20 in question returns to its starting position.

In the embodiment shown, the first spring element 11 is tensioned when the first rotary catch 10 moves counterclockwise as shown in FIGS. 2A, 2B. The second spring element 21 of the second rotary catch 20 is tensioned when the second rotary catch 20 moves clockwise as shown in FIGS. 2A, 2B.

The tabs of the locking pawls 15, 25 are each rotated by their associated third and fourth spring elements 16, 26, which are joined to the lock base S1 at one end and to the locking pawls 15, 25 at the other end, whereby said tabs are moved by the pre-tensioned spring elements 16, 26 counterclockwise into the associated locking contour 12, 22 of the first or second rotary catch 10, 20, on a rotational axis 17, 27 that is perpendicular to the driving direction in the normal installation position.

When the actuating element 1A of the first actuating mechanism 1 is operated, the locking pawls 15, 25 are pivoted clockwise opposite to the force of the associated spring element 16, 26. The second locking pawl 25 leaves the second locking contour 22 of the second rotary catch 20, while the first locking pawl 15 remains locked in the contoured area 12B of the first rotary catch 10. A larger releasing stroke on the part of the first locking pawl 15 is needed in order to unlock the first rotary catch 10, and said stroke is only exerted by actuating the second actuating element 2A of the second actuating mechanism 2.

In the embodiment shown, the first locking pawl 15 and the second locking pawl 25 are arranged so that they can rotate on a shared rotational axis 17, 27 that is perpendicular to the driving direction.

The first latching position I of the lock striker 30 in the backrest lock S shown in FIG. 2A is reached when the backrest lock S of the first part R1 of the backrest R is pushed or moved against the lock striker 30 at a first speed V1 opposite to the driving direction (from the front towards the back of the vehicle). The first speed V1 provided is a first speed V1 that is slower than a normal second speed V2 of the actuation of the first part R1 of the backrest R (V1<V2).

This first latching position I, as one of the locked positions in which the first part R1 of the backrest R has been moved from the left to the right at the first speed V1 according to FIG. 2A, is set in order to move the first part R1 of the backrest R into a cargo position in the vehicle. In the first latching position I of the backrest lock S, the lock striker 30 is positioned in a receptacle 13 of the first rotary catch 10.

The second latching position II of the lock striker 30 in the backrest lock S shown in FIG. 2B is reached when the backrest lock S of the first part R1 of the backrest R is pushed or moved against the lock striker 30 at the second normal speed V2 opposite to the driving direction (from the front towards the back of the vehicle).

This second latching position II, as one of the locked positions in which the first part R1 of the backrest R has been moved from the left to the right at the second speed V2 according to FIG. 2B, is set in order to move the first part R1 of the backrest R into a normal position in the vehicle, said position corresponding to the normal sitting position of a passenger. In the second latching position II of the backrest lock S, the lock striker 30 is positioned in a receptacle 23 of the second rotary catch 20.

The structure of the backrest lock S and the associated actuating mechanisms 1, 2 as well as the backrest-folding mechanism 3 allow the procedure described below when it comes to adjusting the inclination or locking a backrest R or part R1, R2 of a backrest R relative to the car body K, K1.

As a complement to FIGS. 2A, 2B, a side view of the backrest lock S (now in a housing) is shown in FIGS. 3A, 3B, each time in locked positions in the first latching position I (FIG. 3A) as well as in the second latching position II (FIG. 3B).

Inside the lock receptacle S3 of the backrest lock S, essentially all that can still be seen are the first and second rotary catches 10, 20, so that the detailed description given below pertaining to the functions again makes reference to FIGS. 2A, 2B for comparison purposes.

FIG. 3 C shows the first part R1 of the backrest R in a side view in the first latching position I (left) and in the second latching position II (right).

In the first latching position I of the backrest lock S, the first part R1 of the backrest R is arranged more steeply relative to an imaginary vertical line. This position corresponds to the cargo position of the first part R1 of the backrest R since a cargo space located behind the first part R1 of the backrest R has a larger cargo volume. In the embodiment shown, a positioning angle of about 22° to 26° is being proposed for the first part R1 of the backrest R, said angle being formed between an imaginary vertical line and the longitudinal axis of the positioned first part R1 of the backrest R.

In the second latching position II of the backrest lock S, the first part R1 of the backrest R is arranged less steeply relative to an imaginary vertical line. This position corresponds to the normal position of the first part R1 of the backrest R, whereby the cargo space located behind the first part R1 of the backrest R has a smaller cargo volume in comparison to that of the cargo position. In the embodiment shown, a positioning angle of about 28° to 32° that is considered as being comfortable for a person sitting on the vehicle seat is being proposed for the first part R1 of the backrest R, said angle being formed between an imaginary vertical line and the longitudinal axis of the positioned first part R1 of the backrest R.

Folding Function of the Backrest:

For purposes of folding down the first part R1 of the backrest R, the actuating element 2A of the second actuating mechanism 2 is actuated. This actuation, which can be executed in the first as well as in the second latching position I, II, uses a mechanism (not shown here) of the second actuating mechanism 2—which has a releasing stroke of the first locking pawl 15 that is possibly greater than the stroke of the first actuating mechanism 1—to ensure that the locking pawls 15, 25 move into a position in which the tabs of the locking pawls 15, 25 no longer assume a locked position I, II relative to the locking contours 12, 22 of the rotary catches 10, 20.

Depending on the position, i.e. the first or the second latching position I, II, in which the first part R1 of the backrest R is at a given moment, the strong force of the spring element of the backrest-folding mechanism 3—superimposed with the lesser force of the rotary catches 10, that are returned by the associated spring elements 11, 21—ensures that the first part R1 of the backrest R or parts R1, R2 thereof can be folded down freely onto the seat cushion. Towards this end, the now unlocked rotary catches 10, 20 release the area of the lock striker 30 located in the jaw-like receptacle 13, 23 of the rotary catches 10, 20. The backrest R or parts R1, R2 thereof is/are completely unlocked.

This meets the required second precondition, namely, that the backrest R or a part R1, R2 of the backrest R can be folded down onto a seat part.

Cargo Position of the Backrest:

The backrest R, R1, R2 can be moved from the folded-down position, namely, an unlocked position III—in which the first part R1 of the backrest R has been folded down by essentially 90° onto the seat part—into the first latching position I. If the second actuating element 2A of the second actuating mechanism 2 was released after the first part R1 of the backrest R was unlocked and folded down, then, without the lock striker 30 being latched in the backrest lock S, the rotary catches 10, 20 assume the following positions: the unlocked rotary catches 10, 20 are each positioned by the spring elements 11, 21 in a starting position.

The force of the associated first spring element 11 causes the first rotary catch 10 to assume a starting position in which the flanks of the jaw of its rotary catch receptacle 13 are arranged essentially parallel to the flanks of the lock receptacle S3 (not shown here).

The force of the associated second spring element 21 causes the second rotary catch 20 to assume a starting position in which the opening of the jaw of its rotary catch receptacle 23 is oriented towards the lock receptacle S3 (not shown here).

The first part R1 of the backrest R is folded upwards out of the described starting position of the rotary catches 10, 20 of the backrest lock S (FIGS. 4A, 4C-1, from the left to the right) while overcoming the vertical dead center position, and backwards while overcoming the vertical dead center position in the vehicle, so that the lock receptacle S3 reaches the area of the lock striker 30 that is crosswise thereto, as a result of which the lock striker 30 enters the receptacle 13 of the first rotary catch 10. The first rotary catch 10 is pivoted counterclockwise around the pivoting axis 14 and is firmly locked in the locking contoured areas 12A, 12B of the first rotary catch 10 by means of the tab and of the recess of the first locking pawl 15, as is shown in FIGS. 2A, 3A, 4A, 4C-2. In this process, the associated third spring element 16 of the first locking pawl 15 pulls the latter beyond the rotational axis 17 of the first locking pawl 15 counterclockwise onto the first locking contour 12 into the groove-like receptacle 12A and into the web-like receptacle section 12B. The rotary catch receptacle 13 is now open towards the top inside the backrest lock S (FIG. 2A), standing essentially vertically, and secures the lock striker 30 in the first latching position I.

This first latching position I is only reached if the first part R1 of the backrest R is pushed or moved against the lock striker 30 at a slower first speed V1 that is of a smaller magnitude than the normal second speed V2.

Normal Position of the Backrest:

The first part R1 of the backrest R is folded upwards out of the described starting position of the rotary catches 10, 20 of the backrest lock S (FIGS. 4B, 4C-2, from the left to the right) while overcoming the vertical dead center position in the vehicle, so that the lock receptacle S3 reaches the area of the lock striker 30 that is crosswise thereto, as a result of which the lock striker 30 enters the receptacle 23 of the second rotary catch 20.

This second latching position II is only reached if the first part R1 of the backrest R is pushed or moved against the lock striker 30 at a normal second speed V2 that is of a greater magnitude than the first speed V1.

When the first part R1 of the backrest R is folded down at the second speed V2 that is greater than the first speed V1 at which the backrest lock S is pushed or moved against the lock striker 30, then it happens that the first rotary catch 10 is bypassed since the inertia of the first locking pawl 15 is so great that the first rotary catch 10 cannot be locked in the first latching position I.

To put it in other words, while the first part R1 of the backrest R is being folded down, when the first rotary catch 10 of the backrest lock S is pushed or moved at the second speed V2 against the lock striker 30, the acceleration of the rotational movement of the first locking pawl 15 around the rotational axis 17 is not sufficiently high to bring about a locking relative to the first rotary catch 10.

After the lock striker 30 has reached the second rotary catch 20, the latter is pivoted clockwise around the pivoting axis 24 and then firmly locked to the locking contour 22 by means of the tab of the second locking pawl 25, as is shown in FIGS. 2B, 3B, 4B, 4C-2. In this process, the associated fourth spring element 26 of the second locking pawl 25 pulls the second locking pawl 25 beyond the rotational axis 27 of the second locking pawl 15 [sic] counterclockwise behind the web-like projection 22A of the locking contour. The receptacle 23 of the second rotary catch 20 is now open towards the bottom inside the backrest lock S (FIG. 2B), standing essentially vertically, and it secures the lock striker 30.

In this second latching position II, however, the lock striker 30 remains in contact with the first rotary catch 10 and forms a contact point 18 (FIGS. 2B, 3B) that holds the first rotary catch 10 in the second latching position II in a favorable transfer position for the lock striker 30, as will still be elaborated upon below.

This second latching position II is only reached if the first part R1 of the backrest R is pushed against the lock striker 30 at a normal second speed V2 that is greater than the first speed V1. In other words, the first latching position I is only reached if the first speed V1 of the first part R1 of the backrest R for latching the lock striker 30 is smaller than the second normal speed V2, that is to say, if the movement of the first part R1 of the backrest R is slower.

Therefore, the second precondition is met, which requires that the inclination of the backrest R or of a part R1, R2 of the backrest R can be easily adjusted by means of the backrest lock S.

Changing the Backrest from the Cargo Position to the Normal Position and Vice Versa:

The description so far has illustrated that the first part R1 of the backrest R can be adjusted in several slanted positions (cargo position I and normal position II). Moreover, however, it is likewise possible to change the positions from the cargo position I into the normal position II and vice versa.

In this context, an adjustment into various positions is possible—cargo position to normal position I, II and vice versa—without there being a need here for a part R1, R2 or the backrest R to be completely unlocked relative to the lock striker 30 and thus to the car body K, K1. This ensures compliance with the third precondition, namely, the safety of the locking and adjustment assembly and thus the greater safety of the backrest R, R1, R2, when said backrest R, R1, R2 has been adjusted, in the case of a crash, as will be explained below.

In order to change the latching positions I, II, the appertaining actuating element 1 of the first actuating mechanism 1 has to be actuated.

If, for instance, the cargo position (first latching position I) has been set and a person sitting on the vehicle seat would like to set the normal position (second latching position II) (change from FIG. 2A to FIG. 2B), this person can actuate the conveniently accessible actuating element 1A. The first locking pawl 15 and the second locking pawl 25 are actuated and the first locking pawl 15 releases the locking contoured area 12A. If the backrest R, R1 is pushed by the sitting person or moved in some other way towards the back, that is to say, further against the lock striker 30, then the latter reaches the receptacle 23 of the second rotary catch 20, which is still in its starting position and, after the first actuating element 1A is released, as already described, the backrest R, R1 will be locked or latched by means of the second locking pawl 25 on the second locking contour 22 in the normal position II (FIGS. 2B, 3B, 4B, 4C-2).

If the normal position (second latching position II) has been set and if a person sitting on the vehicle seat would like to set the cargo position (first latching position I) (change from FIG. 2B to FIG. 2A), this person will once again actuate the conveniently accessible actuating element 1A.

In this case, both locking pawls 15 and 25 are actuated once again, whereby the second locking pawl 25 is unlocked relative to the second locking contour 22, so that the first part R1 of the backrest R—assisted by the strong spring force of the backrest-folding mechanism 3 and superimposed with the spring force of the second spring element 21—is once again received by the receptacle 13 of the first rotary catch 10 due to the second rotary catch 20 that is returning. This easy transfer is made possible because, in the second latching position II, the lock striker 30 has remained in contact with the first rotary catch 10 via the contact point 18 (FIG. 2B, 3B), and, in the second latching position II, the lock striker 30 holds the first rotary catch 10 in a favorable transfer position for the lock striker 30. Therefore, the lock striker 30 slides smoothly into the receptacle 13 of the first rotary catch 10.

In this context, however, the first rotary catch 10 is only turned clockwise up to a point and then locked by means of the first locking pawl 15 (FIGS. 2A, 3A, 4A, 4C-1), so that the lock striker 30 cannot leave the first receptacle 13 of the first rotary catch 10. The lock striker 30 remains secured inside the backrest lock S since the contoured area 12B of the locking contour 12 is still in a covered position relative to the first locking pawl 15 and since, when the first actuating element 1A of the first actuating mechanism is actuated, the releasing stroke of the first locking pawl 15 is smaller than in the case of the second actuating mechanism 2. When the first actuating element 1A is actuated, the releasing stroke of the first locking pawl 15 is only of such a magnitude that the first rotary catch 10 is not released from the first locking pawl 15.

A complete unlocking of the backrest R or of a part R1, R2 of the backrest R, as already explained, is only possible by actuating the second actuating mechanism 2.

Since only the lock striker 30 is arranged on the car body, the backrest lock S of this invention, or else other backrest locks of this generic type, can be employed without the need to make any changes to the car body. The backrests R can also be provided in modular form with other backrest locks. This advantageously translates into greater flexibly when it comes to the use of different backrest locks.

Moreover, from a control standpoint, the proposal is being made to couple the second actuating mechanism 2 to the speed of the vehicle. For safety reasons, an unlocking by means of the second actuating element 2A of the second actuating mechanism 2 in order to unlock the backrest R or parts R1, R2 thereof is prevented by these controls as specified by certain conditions.

As a condition, the speed of the vehicle is used or else the speed of the vehicle is supplied to the controls for safety reasons. Actuation of the second actuating element 2A of the second actuating mechanism 2 is prevented if the vehicle is moving.

However, it should always be possible to actuate the first actuating element 1A of the first actuating mechanism 1 in order to unlock the backrest R or parts R1, R2 of the backrest R, since, as described, there is no risk that a completely unlocked position will be reached when the first actuating mechanism 1 is actuated during the change from the cargo position I to the normal position II and vice versa.

LIST OF REFERENCE NUMERALS

S lock/backrest lock
S1 lock base
S2 lock housing cover
S3 lock receptacle
R backrest
R1 first part of a backrest R2 second part of a backrest
1 first actuating mechanism
1A first actuating element
1B Bowden cable
1C holding cradle
2 second actuating mechanism
2A second actuating element
2B housing
2C holding cradle
3 backrest-folding mechanism
10 first rotary catch
11 first spring element
12 first locking contour
12A groove-like receptacle
12B web-like receptacle section
13 rotary catch receptacle
14 pivoting axis of the first rotary catch
15 first locking pawl
16 third spring element
17 rotational axis of the locking pawl
18 contact point
20 second rotary catch
21 second spring element
22 second locking contour
22A web-like projection
23 rotary catch receptacle
24 pivoting axis of the first rotary catch
25 second locking pawl
26 fourth spring element
27 rotational axis of the locking pawl
30 lock striker
V1 first speed
V2 second speed
I locked position—first latching position (cargo position)
II locked position—second latching position (normal position)
III unlocked position
K car body
K1 wheel housing
Y pivoting axis (R, R1)

The invention claimed is:

1. A locking and inclination-adjustment assembly for locking and adjusting the inclination of a part of a vehicle comprising
a lock striker arranged on a vehicle body, and
a lock arranged on the part, said lock being joined to the lock striker when in a locked position and being detachable from the lock striker when in an unlocked position,
wherein the lock arranged on the part has rotary catches with corresponding locking pawls, whereby the part can be moved and locked in several reversible latching positions on the lock striker that engages with the lock, and the part can be moved into the unlocked position separately from the lock striker,
wherein, when the part is in the unlocked position, it can be locked in one of the rotary catches in one latching position or another as a result of a speed-dependent folding movement of the part, and
wherein, when the part is in the unlocked position, it is locked in a first latching position in a first rotary catch as a result of a folding movement at a first speed, or else it is locked in a second latching position in a second rotary catch as a result of a folding movement at a second speed, wherein the first speed is slower than the second speed.

2. The locking and inclination-adjustment assembly according to claim 1, wherein the actuation of a first actuation mechanism associated with the assembly adjusts the various inclinations of the part, from one latching position to the other and vice versa.

3. The locking and inclination-adjustment assembly according to claim 2, wherein the adjustment of the various inclinations of the part from one latching position to the other and vice versa takes place by actuating a first actuation mechanism, without causing the part to move into the unlocked position.

4. The locking and inclination-adjustment assembly according to claim 2, wherein the lock striker unlocks the part from each of the latching positions of the part, moving it into the unlocked position, exclusively by actuating a second actuation mechanism that is associated with the assembly.

5. The locking and inclination-adjustment assembly according to claim 1, wherein the lock arranged on the part has a first and a second rotary catch with corresponding locking pawls, whereby the part can be moved and detachably locked in a first latching position in the first rotary catch or in a second latching position in the second rotary catch on the lock striker that engages with the lock.

6. The locking and inclination-adjustment assembly according to claim 1, wherein, by means of a backrest-folding mechanism associated with the assembly, the part can be automatically moved with the assistance of springs out of the latching positions into the unlocked position, or out of the second latching position into the first latching position.

7. A vehicle having a locking and inclination-adjustment assembly according to claim 1.

8. The vehicle according to claim 7, wherein the actuation of a first actuation mechanism associated with the assembly adjusts the various inclinations of the part, from one latching position to the other and vice versa.

9. The vehicle according to claim 8, wherein a second actuation mechanism allows the part to be unlocked from each of the latching positions into the unlocked position, whereby a control signal can be impinged onto the second actuation mechanism, thus only allowing a complete unlocking of the part if the vehicle is not moving.

* * * * *